Patented Oct. 2, 1934

1,975,609

UNITED STATES PATENT OFFICE 1,975,609

AZO DYE AND METHOD FOR ITS PREPARATION

Arthur Howard Knight, Ashton-on-Mersey, England, assignor to Imperial Chemical Industries Limited, a corporation of Great Britain No Drawing. Application October 1, 1932, Serial No. 635,860. In Great Britain November 6, 1931

14 Claims. (Cl. 260—83)

This invention relates to azo dyes and more particularly refers to disazo dyes having excellent affinity for cellulose esters and ethers.

It is an object of the invention to produce azo dyes which impart colors, particularly violet to black shades, to cellulose derivatives. A further object is to produce dyes having exceptional fastness to light and washing. A still further object is to produce dyes which may be readily discharged. Additional objects will appear hereinafter.

These objects are attained by coupling a diazotized amino compound of the benzene or naphthalene series, containing no nitro groups, with a dialkoxy-aniline, diazotizing the resulting aminoazo compound and coupling it with an amino-naphthol.

The invention may be more completely understood by reference to the following illustrative examples in which the quantities are stated in parts by weight.

Example 1

The solution obtained by diazotizing 127.5 parts of o-chloro-aniline in the customary manner was added to a solution of 153 parts of 2-5-dimethoxy-aniline in 370 parts of 10% hydrochloric acid and 6000 parts of water at 10° C. When the combination was complete the aminoazo compound obtained was diazotized by the addition of 72 parts of sodium nitrite, the mixture was stirred at 10° C. until diazotization was complete, the diazo-azo compound being in solution.

This solution was then added to a solution of 159 parts of 1-5-amino-naphthol in 370 parts of 10% hydrochloric acid and 8000 parts of water, and the mixture was stirred until combination was complete. The dyestuff, which was out of solution, was then filtered off, washed with water, and preserved as paste or it may be dried in any suitable way. It dyed cellulose acetate in clear blue shades. In place of the dimethoxy-aniline of the above example there may be employed 181 parts of diethoxy-aniline in which case the dyestuff obtained produces greenish navy blue dyeings.

The dyestuff paste containing one part of the dyestuff prepared according to Example 1 was added to the dyebath containing a very small amount (about 1/100th part) of the substance obtained by condensing naphthalene sulfonic acid with formaldehyde (cf. Example 1 of British Specification No. 224,077) and to the lukewarm dyebath was then added 100 lbs. of cellulose acetate yarn. The temperature was raised to 80° C. during half an hour and the material was dyed for a further half hour at this temperature. It was then washed and dried in the usual way, giving a blue dyeing.

Example 2

The solution obtained by diazotizing 137 parts of cresidine in the customary manner was added to a solution of 153 parts of 2-5-dimethoxy-aniline in 370 parts of 10% hydrochloric acid and 6000 parts of water at 10° C. In order to facilitate combination a solution of 310 parts of sodium acetate in 1400 parts of water was added gradually during half an hour.

When combination was complete to the solution of the monoazo compound so obtained were added 925 parts of 10% hydrochloric acid and 72 parts of sodium nitrite. After stirring for 3½ hours at 10° C. diazotization was complete and the solution of diazo-azo compound so obtained was filtered, if necessary. The solution of the diazo-azo compound was then added to a solution of 159 parts of 1-5-amino-naphthol in 370 parts of 10% hydrochloric acid, and 8000 parts of water, and the mixture stirred until combination was complete. The dyestuff, which was out of solution, was filtered off, washed with water, and preserved as paste. It dyed cellulose acetate in navy blue shades when applied in the manner described in Example 1.

Example 3

143 parts of α-naphthylamine were diazotized in the customary manner and the solution so obtained added to a solution of 153 parts of 2-5-dimethoxy-aniline in 370 parts of 10% hydrochloric acid and 6000 parts of water at 10° C. After stirring at 5–10° C. for 18 hours the coupling was completed by the careful addition during 10 minutes of a solution of 230 parts of sodium acetate in 1000 parts of water. The monoazo compound was out of solution and was filtered off. The paste so obtained was washed with 15% brine and then stirred with 10,000 parts of water at 10° C. 925 parts of 10% hydrochloric acid were then added, followed by 72 parts of sodium nitrite. After stirring at 5–10° C. for 4 hours diazotization was complete and the diazo-azo compound, which was out of solution, was added to a solution of 159 parts of 1-5-amino-naphthol in 370 parts of 10% hydrochloric acid and 8000 parts of water at 10° C. The mixture was stirred until combination was complete when the dyestuff, which was out of solution, was filtered off, washed with water, and preserved as a paste, or dried in any suitable way. It dyed cellulose acetate in black shades when applied in the manner described in Example 1.

For the first component numerous amino compounds of the benzene or naphthalene series, which contain no nitro groups, may be used. These compounds may have substituted thereon, in addition to the amino group, groups such as halogen, alkoxy, alkyl, sulfonamide, and dialkylamino, but should not have substituted thereon sulfonic acid, carboxylic acid or nitro groups. Typical compounds falling within this class are: ortho-chloro-aniline, meta-chloro-aniline, para-chloro-aniline, para-phenetidine, ortho-anisidine, cresidine, ortho-toluidine, meta-toluidine, alpha-naphthylamine, beta-naphthylamine, meta-amino-benzene-sulfonamide, para-amino-benzene-sulfonamide, and para-amino-dimethyl-benzamide.

The middle component is a dialkoxy-aniline in which the alkoxy groups may be the same or dissimilar and in which they may be substituted on the benzene nucleus in other positions than the 2-5-position, mentioned in the above examples. Methoxy and ethoxy groups are preferred, although the invention is not intended to be limited thereto, since other alkoxy groups may also be used. This component may have additional groups substituted thereon, with the exception of the sulfonic acid and carboxylic acid groups. The components selected naturally must be capable of coupling with the diazo salt of the first component and must also be capable of diazotization.

The third component is an amino-naphthol, 1-5-amino-naphthol being preferred. However, the amino and hydroxy groups may occupy other positions on the naphthalene nucleus than the 1-5-position. In addition, this component may have other groups substituted thereon with the exception of the sulfonic acid and carboxylic acid groups.

The conditions under which the process is carried out may be varied within rather wide limits without departing from the scope of the present invention. For instance, the position where the diazotized aminoazo compound will couple with the amino-naphthol end component will depend upon the medium used. Since one skilled in the art will have no difficulty in determining the proper conditions, including the proper coupling media, it is unnecessary to describe the mechanics of the process. Somewhat better results are obtained by coupling the diazotized aminoazo compound with the amino-naphthol in an acid medium, although it is not intended to limit the invention thereto, since products produced by coupling in a non-acid medium are also very satisfactory.

Fabrics may be colored by the products described herein either by dyeing, printing or stenciling. Excellent dyeings are obtained by following the method described in British Patent 224,077.

These products have exceptional affinity for cellulose esters and ethers, and produce very desirable colors, particularly in the range from violet to blue to black. The colors have excellent fastness to light and washing and are also valuable because of the ease with which violet to black shades may be imparted to cellulose derivatives.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized amino compound of the benzene or naphthalene series containing no nitro, carboxylic, or sulfonic group with a dialkoxy-aniline, diazotizing the resulting aminoazo compound and coupling it with an aminonaphthol containing no sulfonic or carboxylic group.

2. A process for producing azo dyes which comprises coupling a diazotized amino compound of the benzene or naphthalene series containing no nitro, carboxylic, or sulfonic group, which may have substituted thereon a member selected from the group consisting of halogen, alkoxy, alkyl, sulfonamide, and dialkyl-amino, with a dialkoxy-aniline, diazotizing the resulting aminoazo compound and coupling it with an amino-naphthol containing no sulfonic or carboxylic group.

3. A process for producing azo dyes which comprises coupling a diazotized amino compound of the benzene or naphthalene series containing no nitro, carboxylic, or sulfonic group, which may have substituted thereon a member selected from the group consisting of halogen, alkoxy, alkyl, sulfonamide, and dialkyl-amino with 2-5-dialkoxy-aniline, diazotizing the resulting aminoazo compound and coupling it with 1-5-amino-naphthol.

4. A process for producing azo dyes which comprises coupling diazotized ortho-chloro-aniline with 2-5-dimethoxy-aniline, diazotizing the resulting aminoazo compound and coupling it with 1-5-amino-naphthol.

5. A process for producing azo dyes which comprises coupling diazotized cresidine with 2-5-dimethoxy-aniline, diazotizing the resulting aminoazo compound and coupling it with 1-5-amino-naphthol.

6. A process for producing azo dyes which comprises coupling diazotized alpha-naphthylamine with 2-5-dimethoxy-aniline, diazotizing the resulting aminoazo compound and coupling it with 1-5-amino-naphthol.

7. An azo dye having the following general formula:

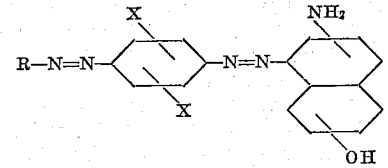

wherein R represents a residue of the benzene or naphthalene series, containing no nitro group, and X represents an alkoxy group.

8. An azo dye having the following general formula:

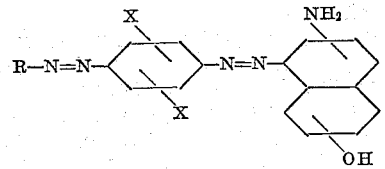

wherein R represents a residue of the benzene or naphthalene series, containing no nitro group, which may have substituted thereon members selected from the group consisting of halogen, alkoxy, alkyl, sulfonamide, and dialkyl-amino, and X represents an alkoxy group.

9. An azo dye having the following general formula:

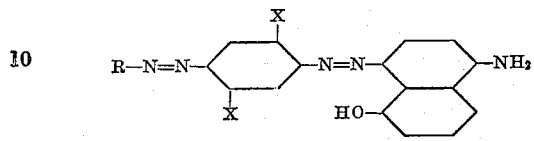

wherein R represents a residue of the benzene or naphthalene series, containing no nitro group, which may have substituted thereon members selected from the group consisting of halogen, alkoxy, alkyl, sulfonamide, and dialkyl-amino, and X represents an alkoxy group.

10. An azo dye having the following formula:

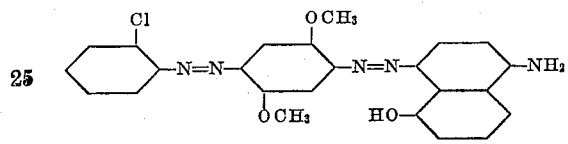

11. An azo dye having the following formula:

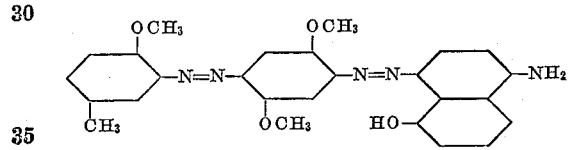

12. An azo dye having the following formula:

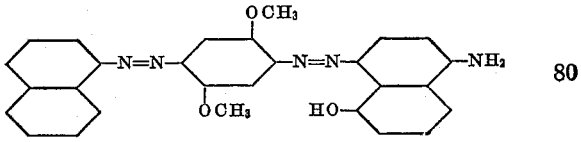

13. Water-insoluble azo dyes having the following general formula:

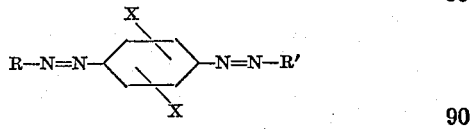

wherein R represents a residue of the benzene or naphthalene series, containing no nitro, carboxylic, or sulfonic group, X represents an alkoxy group, and R' represents the residue of an amino-naphthol containing no sulfonic or carboxylic group.

14. Water-insoluble azo dyes having the following general formula:

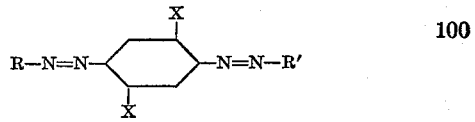

wherein R represents a residue of the benzene or naphthalene series, containing no nitro, carboxylic, or sulfonic group, X represents an alkoxy group, and R' represents the residue of an amino-naphthol containing no sulfonic or carboxylic group.

ARTHUR HOWARD KNIGHT.